United States Patent
Zäncker

(10) Patent No.: US 8,718,044 B2
(45) Date of Patent: May 6, 2014

(54) METHOD AND APPARATUS FOR ASSESSING VOIP PACKET PRODUCTION AND PACKET TRANSMISSION AND INDICATION AT THE END POINTS INVOLVED IN THE VOIP COMMUNICATION

(75) Inventor: Olaf Zäncker, Bad Oldesloe (DE)

(73) Assignee: VoIP Future GmbH, Hamburg (DE)

( * ) Notice: Subject to any disclaimer, the term of this patent is extended or adjusted under 35 U.S.C. 154(b) by 33 days.

(21) Appl. No.: 13/144,908

(22) PCT Filed: Jan. 4, 2010

(86) PCT No.: PCT/EP2010/050007
§ 371 (c)(1),
(2), (4) Date: Sep. 28, 2011

(87) PCT Pub. No.: WO2010/081750
PCT Pub. Date: Jul. 22, 2010

(65) Prior Publication Data
US 2012/0014378 A1    Jan. 19, 2012

(30) Foreign Application Priority Data
Jan. 15, 2009    (EP) .................................. 09150642

(51) Int. Cl.
*H04L 12/66*    (2006.01)

(52) U.S. Cl.
USPC ........... 370/352; 370/252; 370/244; 370/236; 370/237

(58) Field of Classification Search
USPC ........................................................ 370/352
See application file for complete search history.

(56) References Cited

U.S. PATENT DOCUMENTS

| | | | | |
|---|---|---|---|---|
| 7,274,670 B2* | 9/2007 | Hicks et al. | .................... | 370/252 |
| 7,796,524 B1* | 9/2010 | O'Connell et al. | ........... | 370/241 |
| 7,821,957 B2* | 10/2010 | Diethorn et al. | .............. | 370/252 |
| 7,924,733 B2* | 4/2011 | Adhikari et al. | .............. | 370/252 |
| 7,929,435 B2* | 4/2011 | Ono et al. | ...................... | 370/230 |
| 8,027,267 B2* | 9/2011 | Denby et al. | ................... | 370/252 |
| 8,228,813 B2* | 7/2012 | Take et al. | ...................... | 370/252 |
| 8,300,536 B2* | 10/2012 | Hughes et al. | ................ | 370/236 |
| 8,331,246 B2* | 12/2012 | Scobbie | ........................ | 370/252 |
| 2003/0048812 A1* | 3/2003 | Gross | ............................ | 370/516 |
| 2007/0058546 A1* | 3/2007 | Na | ................................ | 370/230 |
| 2008/0062887 A1* | 3/2008 | Parolkar et al. | ............... | 370/252 |
| 2012/0014378 A1* | 1/2012 | Zancker | ....................... | 370/352 |

FOREIGN PATENT DOCUMENTS

WO    02/30042    4/2002

OTHER PUBLICATIONS

International Preliminary Examination Report for PCT/EP2010/050007.

* cited by examiner

*Primary Examiner* — Ian N Moore
*Assistant Examiner* — Lakeram Jangbahadur
(74) *Attorney, Agent, or Firm* — Lowe Hauptman & Ham, LLP

(57) ABSTRACT

The present invention relates to a method and a device for assessing and indicating the quality of VoIP calls, comprising the steps of end-point reception of the VoIP packets over an IP network link, end-point determination of the VoIP quality (QRX) of the received VoIP packet sequence, the VoIP quality (QTX) of the transmitted VoIP packet sequence, exchange of the quality information (QRX and QTX) between the end points, calulation of the difference (QRX-QTX) between the received VoIP quality and the VoIP quality transmitted by the other side; supply of the determined VoIP quality information to a quality indication; and end-point indication of the quality information in optical and/or acoustic form.

17 Claims, 3 Drawing Sheets

Determination and indication of quality information e.g. in opposite direction
Ex. 1) with transmission of quality information on received packet sequence QRX
(QRXA for opposite direction) to transmitter (end point B for opposite direction)

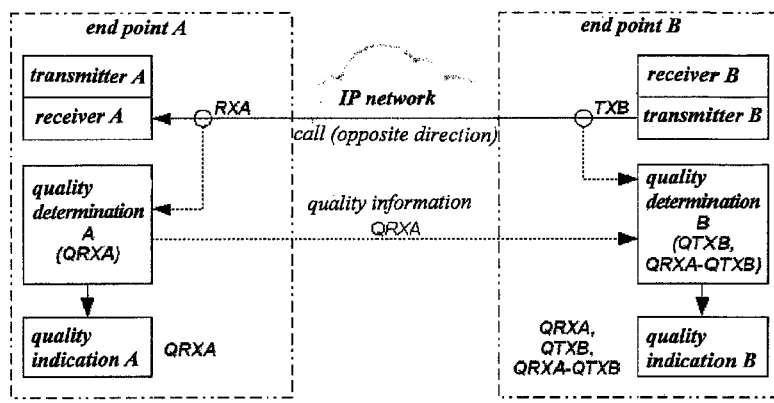

Fig. 3

Determination and indication of quality information e.g. in opposite direction
Ex. 2) with transmission of quality information on transmitted packet sequence QTX
(QTXB for opposite direction) to receiver (end point A for opposite direction)

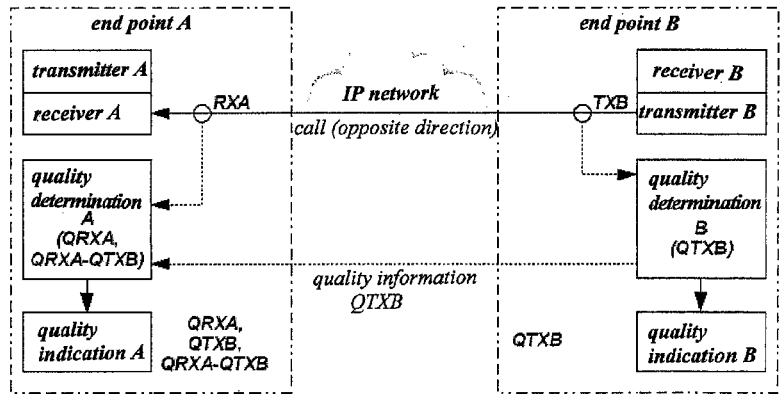

Fig. 4

*optical indicator
(no deviations,
good quality)*

*optical indicator
(deviations,
poor quality)*

METHOD AND APPARATUS FOR ASSESSING VOIP PACKET PRODUCTION AND PACKET TRANSMISSION AND INDICATION AT THE END POINTS INVOLVED IN THE VOIP COMMUNICATION

CROSS REFERENCE TO RELATED APPLICATION

This application claims the priority of European patent application No. 091506418, filed on Jan. 15, 2009 in the European Patent Office, the disclosure of which is incorporated herein in their entirety by reference. Further, this application is the National Phase application of International Application No. PCT/EP2010/050007, filed Jan. 4, 2010, which designates the United States and was published in German. Each of these applications is hereby incorporated by reference in their entirety into the present application.

The present invention relates to the field of telephony over data networks, in short VoIP (Voice over Internet Protocol). In particular, the present invention relates to a method and a device for assessing VoIP packet generation and packet transmission and indication at the end points involved in the VoIP communication.

Since traditional wired (TDM=Time Division Multiplex) telephony involves its own network, its own dedicated call switching and transmission devices and dedicated terminal, the resultant speech quality is permanently high. In view of the exclusivity of the infrastructure, it is unnecessary in traditional telephony to pay specific attention to speech quality.

More and more, TDM telephony is supplemented or substituted by VoIP (Voice over Internet Protocol). In contrast to TDM telephony, VoIP telephony does not involve either its own network or its own call switching and transmission components. In some cases (known as "soft-client"), a dedicated terminal is not even assigned to the VoIP service.

VoIP (Voice over Internet Protocol) is a technology that makes it possible to transmit the continuous audio stream of a telephone call in the form of data packets over a packet-oriented network (IP network). In contrast to other forms of data transmission in IP networks, the medium speech (audio), if transported in the form of data packets, requires a continuous data flow where the packets are always transmitted at the same time intervals (isochronously). IP networks, however, generally are not suitable to guarantee the isochronous transmission of a stream of data packets. Moreover, the VoIP data packets compete with the data packets of other applications for the same bandwidth and transmission infrastructure (IP network and its active components).

IP networks therefore are not designed for guaranteeing transmission. Even if the transmission of the VoIP packets is prioritised, there are delays, jitters and VoIP packet losses. VoIP interferences are either caused during the transmission (i.e. in the IP network used) or in the VoIP system and may thus be due to problems in the implementation, configuration and/or capacity.

Therefore, VoIP data transmission is subject to numerous interferences resulting in poor quality—e.g. poor speech quality. For avoiding poor quality as far as possible, producers of VoIP systems usually suggest testing the IP networks for their VoIP capabilities before using a VoIP system. These tests (also called VoIP assessment, VoIP pre-deployment etc.) involves feeding simulated VoIP traffic into the IP network to be tested and assessing the transmission quality after transmission. If the test results are poor, the efficiency of the IP network may be enhanced (greater band width, traffic prioritisation, physical and/or logical restructuring, other active components etc.).

The IP network may be a local area network (LAN) and/or a wide area network (WAN). Consequently, VoIP is also transmitted via WLAN (VoWLAN). In addition to the parameters influencing wired IP networks, WLAN further involves as interferences i.a. the quality of a radio cell per se as well as the pullout or exchange of radio cells.

VoIP, which cannot guarantee service quality, will replace more and more often traditional TDM telephony as voice service. This causes problems for the user since the voice service may be considered mission-critical although users expect TDM telephony of high quality. In particular the use of mobile end points leads to further interferences in the VoIP quality. The communication partners (users) often continue a call for some time although the connection is poor or already interrupted without being aware of the interference or interruption.

Reference is made to prior art documents US 2008/062887, WO 02/30042, US 2007/058546 or US 2003/048812.

Therefore, it is the object of the present invention to provide the VoIP user with a method of realtime or prompt assessment of the VoIP packet generation and packet transmission just carried out. This object is achieved by the features of the claims.

According to a first aspect, the invention provides a method of assessing an IP network packet generation and transmission. According to the invention, this is achieved by an end-point reception of a VoIP packet sequence over an IP network connection; an end-point determination of the quality (QRX) of the received packet sequence (RX); supply of the determined quality information (QRX) to a quality indication and end-point indication of the quality information.

Preferably, the method includes the further step of end-point determination of the quality (QTX) of the packet sequence (TX) sent by the end point in its function as transmitter, wherein the quality information supplied to the quality indication may consist of the quality (QRX) of the received packet sequence (RX), the quality (QTX) of the packet sequence (TX) transmitted by the end point in its function as transmitter or a combination thereof. For an end point A the quality information is QRXA and QTXA.

The quality is preferably determined continuously or periodically during and/or at the end of the transmission of the VoIP packet sequence.

The generation of quality information on undisturbed sequences in a VoIP packet sequence or completely undisturbed transmissions of VoIP packet sequences is preferably reduced or completely inhibited. The generated quality information preferably consists of good/poor statements or information expressing the gradual quality deviation from normal or target conditions. The quality information may relate to the whole VoIP call or only parts thereof.

According to a further preferred embodiment, each end point (A, B) transmits the transmission quality information of a VoIP packet sequence (QTXA, QTXB) determined in its function as transmitter (A, B) to the other end point. Alternatively and also additionally, each end point (A, B) further transmits the reception quality of a VoIP packet sequence (QRXA, QRXB) determined by it in its function as receiver (A, B) to the other end point. It is further preferred that one end point (A, B) of the VoIP packet generation and connection calculates the difference between the quality information determined in the function as receiver and the quality information transmitted by the other end point in its function as receiver. The difference between two pieces of quality information thus calculated represents the quality of the IP network packet connection (QRXA-QTXB=quality of the IP network packet connection in opposite direction or QRXB-QTXA=quality of the packet connection in outward direction). Alternatively or also additionally, one end point (A, B) calculates the difference QTXA-QRXB or QTXB-QRXA between the quality information determined in its function as transmitter and the quality information transmitted by the other end point in its function as receiver.

The quality is preferably indicated in the form of an optical and/or acoustical indicator. In case of an optical display, the previous development of the quality information may be summarily indicated.

According to the present invention, e.g., the distance and the distance variance of individual VoIP packets or a "more significant" information expressing the concrete reasons for the quality restriction (such as "configuration of transmitter sample rate erroneous" or "full capacity of IP network/packet buffering" or the like) are evaluated as quality information.

According to a further aspect, a device for assessing a VoIP packet generation and transmission is provided, comprising: an end-point receiver for receiving a VoIP packet sequence (RX) over an IP network link; end-point means for determining the quality (QRX) of the received VoIP packet sequence (RX); means for supplying the determined quality information to a quality indication; and end-point indication means for indicating the quality information (QRX).

Eventually, according to a further aspect of the present invention, a VoIP packet generation and transmission system having a first end point (A) with a transmitter and a receiver and a second end point (B) with a transmitter and a receiver are provided. At least one of the two receivers (A, B) comprises means for determining the receiver quality (QRX, e.g. QRXA for end point A) of the VoIP packet sequence (RX, e.g., RXA at end point A) received from the other end point. The respective other end point comprises means for determining the transmission quality (QTX, e.g., QTXB for end point B) of this transmitted VoIP packet sequence (TX, e.g., TXB at end point B) on the transmitter side and for transmitting the transmission quality information (QTX, e.g., QTXB for end point B) to the receiver end point (e.g., end point A). Moreover, the receiver end point (e.g., end point A) comprises means for transmitting the determined quality information to a quality indication, wherein the quality information consists of the receiver quality information (e.g., QRXA at the end point A), the transmission quality (e.g., QTXB at the end point B) or the difference thereof, and indication means for indicating the quality information.

Thus, (i) the receiver end point comprises means for calculating the difference between the two pieces of quality information (QRXA-QTXB or QRXB-QTXA) and transmitting the determined quality information to a quality indication, wherein the quality information is determined from the difference between the receiver quality and the transmission quality of the respective other end point; and/or (ii) the transmitter end point comprises means for forming the difference between both pieces of quality information (QTXA-QRXB or QTXB-QRXA) and transmitting the determined quality information to a quality indication, wherein the quality information is determined from the difference between the transmission quality and the receiver quality of the respective other end point.

The present invention is technically advantageous in that a service- or application-related quality information for VoIP is indicated, thus enabling the indication of i.a. the reception quality of the transmitted VoIP call on the receiver side (e.g. QRXA) at the transmitting end point (e.g., end point B; i.e. in the opposite direction). A further advantage consists in the fact that by means of the quality information exchange between transmitter and receiver, a quality difference thus corresponding to the quality of the transmission path (IP network) may be calculated and indicated at both end points. Moreover, it is advantageous for certain types of end points to realise the quality information alternatively by an acoustic "in-band" indication.

The present invention will be illustrated in the following by means of the attached drawings, in which:

FIG. 3 shows Example 1 of a preferred embodiment according to FIG. 2;

FIG. 4 shows Example 2 of a preferred embodiment according to FIG. 2; and

Figure 1:
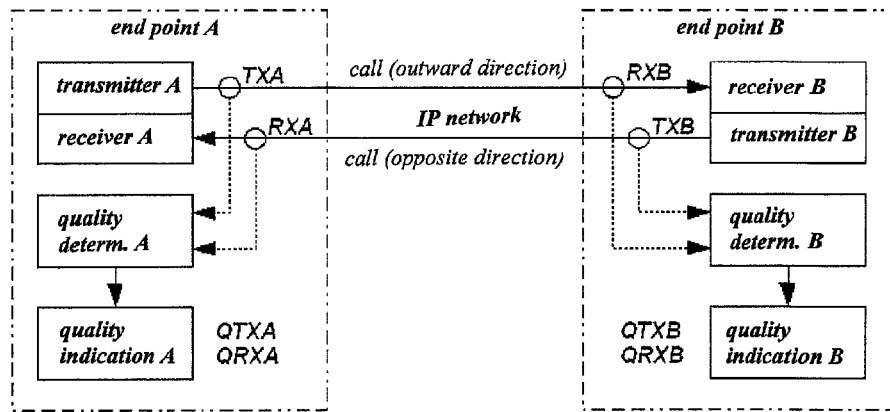
FIG. 1 shows a schematic view of a preferred embodiment of the invention.

FIG. 1 shows a schematic view of a preferred embodiment of the invention. In this embodiment, the generation of the VoIP packet sequence and the IP network connection are monitored at end point A or end point B or at both end points. In particular, FIG. 1 shows two end points A and B that communicate with each other. For a VoIP call in opposite direction, i.e. from end point B to end point A, end point B forms transmitter B whereas end point A forms receiver A.

At end point A, the quality QRXA (opposite direction, sent by end point B=TXB) of the VoIP service received by receiver A, i.e. the VoIP packet sequence received via the IP network connection, is first determined. Preferably, at end point A, the quality of the (voice) packet sequence QTXA (transmitter A=TXA, outward direction) sent by its own transmitter A is determined. The result of quality determination A at end point A is then transmitted to a quality indication at end point A. Eventually, either quality information QRXA or QTXA or both of them is/are indicated to the user at end point A, for example, optically and/or acoustically.

In the outward direction, end point A acts as transmitter A whose quality QRXB received by end point B is assessed at end point B. Preferably, the quality of end point B's own VoIP packet sequence QTXB sent by end point B is also determined there. End point B is thus capable of transmitting for the user at end point B either quality information QRXB or QTXB or both of them simultaneously to an optical and/or acoustical indication.

The term "end point" is a collective term for wired or wireless (mobile) VoIP devices or VoIP applications associated with a user or a user group. It can refer to IP telephones, DSL boxes, integrated access devices (IADs) (triple play, quadruple play), media gateways, session border controllers and similar devices. Moreover, for simplifying FIG. 1, a bidirectional VoIP communication has been selected. However, our statements above generally also apply to communication with more than two end points, such as VoIP telephone conference or in general a point-to-multipoint connection. Furthermore, the method is also applicable to other communication methods (such as mobile telephony) or media (such as video).

The quality information is preferably both determined and indicated continuously or periodically during the VoIP call (a VoIP packet sequence) and/or at the end of a VoIP call (a VoIP packet sequence). For reducing the information to the most important aspects, the generation and indication of quality information for undisturbed sequences of a VoIP call or for completely undisturbed VoIP calls may optimally moreover be reduced or completely inhibited. In such a case of a reduction to poor quality, the quality indication/display would be more like a quality warning.

Figure 2:
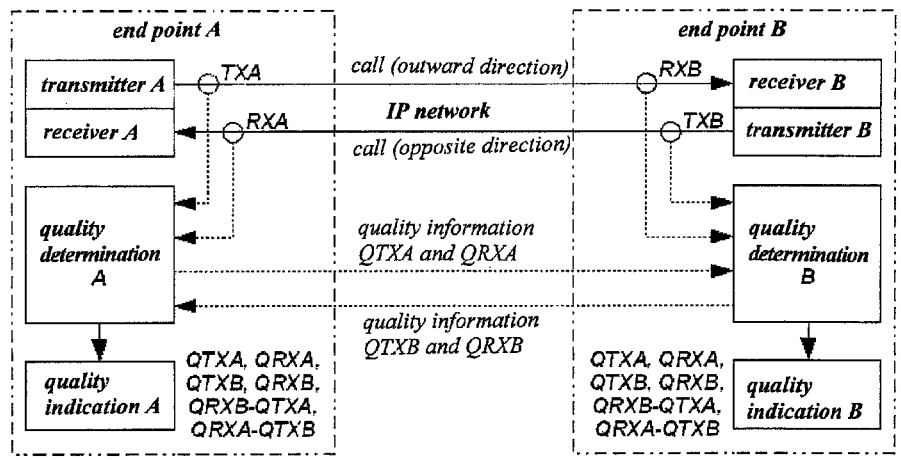
FIG. 2 shows a schematic view of a further preferred embodiment of the method according to the present invention.

FIG. 2 shows a schematic view of a further preferred embodiment of the method according to the present invention.

In this preferred embodiment, end points A and B, which are involved in a VoIP communication, exchange the results of their quality determination A (QTXA, QRXA) or B (QTXB, QRXB). The quality information may be exchanged continuously or periodically during the VoIP call and/or at the end of a VoIP call.

The type of quality information exchanged between the two end points A and B may either involve simple good/poor statements or may express the degree of deviation of the determined actual quality from normal or target quality conditions. Both good/poor statement and the quality degree may relate to a complete VoIP call or the poor-quality sequences of a VoIP call.

In the preferred embodiment shown in FIG. 2, four different pieces of quality information (QTXA, QRXA, QTXB, QRXB)—i.e. at both end points two pieces of quality information generated by the quality determination of the one end point and two pieces of quality information generated by the quality determination of the other end point and received from the latter—are thus available to the end points involved in a bilateral VoIP communication upon a mutual exchange of quality information. Consequently, the end points (e.g., end point A) are capable of indicating the quality (QRXB) received at the other end point (end point B) or of determining a new quality information from the difference between two pieces of quality information (e.g., QRXB-QTXA, i.e., in terms of the outward direction, the difference between the received and the transmitted quality and thus the contribution of the IP network to the quality change during the transmission from end point A to end point B) and transmits it to the indication. Moreover, for having all four pieces of quality information, the same end point (e.g., end point A) is of course also capable of generating and indicating the difference between the pieces of quality information (such as QRXA-QTXB) for the opposite direction. The statements as to end point A analogously apply to end point B.

The next two figures illustrate in which direction the quality information is transmitted and which of the two end points involved in a bilateral communication can calculate the difference.

FIG. 3 concretises FIG. 2 using Example 1. Example 1 illustrates the determination and indication of quality information in the opposite direction (with end point B transmitting, end point A receiving) of the VoIP call. The concretisation essentially refers to the transmission of the quality information and the possibility of calculating the difference resulting therefrom. All statements in Example 1 as to the opposite direction analogously apply to the outward direction.

The transmitting end point B determines the transmission quality QTXB of the VoIP packet sequence TXB transmitted by it, the receiving end point determines the reception quality QRXA of the received VoIP packet sequence RXA which corresponds to the VoIP packet sequence TXB sent by end point B. The receiving end point A transmits the information on the reception quality (QRXA) of the received VoIP packet sequence (RXA) to the transmitting end point B. End point B is thus capable of additionally calculating the difference between two pieces of quality information—in this case, between the quality (QRXA) received at end point A and the quality (QTXB) transmitted by end point B. The resultant difference (QRXA-QTXB) corresponds to the transmission quality of the VoIP packet sequence in opposite direction. Thus, three different pieces of quality information (QRXA, QTXB, QRXA-QTXB), which have in part been determined by the other end point (QRXA), are available to end point B; these information pieces may alternatively or in any combination be transmitted to the quality indication at end point B. To end point A, only the quality information (QRXA) of the received VoIP packet sequence (RXA) is available for the quality indication at end point B.

If the method described in Example 1 for the opposite direction is analogously applied to the outward direction, four pieces of quality information that may be supplied to the indicator alternatively or in any combination are available to each end point A and B.

FIG. 4 concretises FIG. 2 by means of a further Example 2. As Example 1, Example 2 illustrates the determination and indication of the quality information in opposite direction (end point B transmitting, end point A receiving) of the VoIP call. The concretisation essentially refers to the quality information transmission and the resulting possibility of calculating the difference—which differs from that of Example 1 in the transmission direction of the quality information and the end point calculating the difference. All statements in Example 2 as to the opposite direction analogously apply to the outward direction.

In Example 2, in contrast to Example 1, the transmitting end point B transmits the quality information (QTXB) to receiving end point A. Thus, receiving end point A is capable of calculating the difference between two pieces of quality information (QRXA and QTXB). In Example 2, three pieces of quality information (QRXA, QTXB, QRXA-QTXB), which have in part been generated at the other end point, are available to end point A; these pieces of information may be supplied alternatively or in any combination to the quality indication at end point A. Only the quality information (QTXB) of the VoIP packet sequence (TXA) transmitted by end point B is available to the latter for indicating the quality.

If the method described in Example 2 for the opposite direction is analogously applied to the outward direction, four pieces of quality information that may be supplied to the indication alternatively or in any combination are available to each end point A and B.

Both variants (Example 1=FIG. 3 and Example 2=FIG. 4) constitute alternatives; however, it is also possible to combine both variants at the end points.

Figure 5:
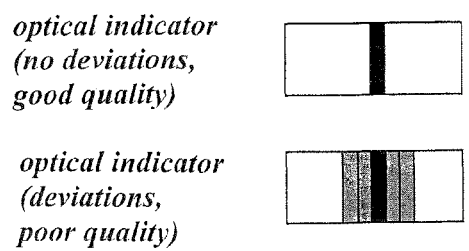
FIG. 5 shows an example of an optical quality indication according to the invention at one end point.

According to the present invention, the type of quality indication may vary. The simplest type is a good/poor statement; however, more complex quality indications, e.g. in the form of a bar of variable width, are also possible. This is for example illustrated in FIG. 5. There are different types of bar indicators that either represent processed, superior quality information or are directly derived from a KPI (key performance indicator), as for example the interval between the VoIP packets (inter-arrival time) or their variance. In the latter case, e.g., a bar in the middle of the indicator would represent a standardised packet interval (such as 20 ms). If quality is good (upper part of FIG. 5), only the medium bar is visible. Deviations or negative or positive variances in the VoIP packet intervals (jitters) as compared to normal conditions would be indicated by additional bars at both sides of the middle bar. Alternatively, the bar representing normal conditions could also be outside the middle since negative and positive deviations of the packet intervals (jitters) are not necessarily symmetrical to the standard interval. In principle, in case of other forms of voice transmission than VoIP (such as mobiles), other media than voice (such as video) or other protocols than IP, other KPIs are also possible.

If the cause of a VoIP quality problem can be localised (IP network or VoIP system), this information is preferably also indicated. If it is moreover possible to determine the nature of a VoIP quality problem (implementing problem, configuration problem, performance problem), this can be taken into account by the indicator. If the problem may be localised or the nature of the problem may be determined, a clear symbol (end point, network) and/or plain text is/are preferably indicated.

VoIP quality problems may, e.g., be localised by interpretation (e.g., by means of pattern matching and derivation of a respective information) of the measured parameters themselves which eventually form the quality information.

Moreover, VoIP quality problems can also be localised in that the quality is determined at two points, already on the transmitter side (QTX), i.e. at the beginning of the transmission path (e.g., IP network) and on the reception side (QRX), i.e. at the end of the transmission path. Localisation can thus be achieved as follows:
  The quality on the transmitting side (QTX) per se already localises the transmitter as reason for poor quality.
  The difference (QRX-QTX) between the quality of a VoIP packet sequence on the reception side (QRX) and the quality of the same VoIP packet sequence on the transmitting side (QTX) localises the transmission path (e.g., IP network) as reason for poor quality.

All comments on the transmission path so far referred to the complete transmission path (e.g. the entire path of a local area network between two IP telephone sets); however, if the respective quality determination means are used, it is of course also possible to determine the quality of sections of a transmission path (in case of LAN, e.g., uplink, backbone, downlink).

According to the present invention, all the aforementioned variants of quality indication may be combined. In accordance with the type of end point and the optical quality information to be indicated, a yes/no information is indicated (for example by means of one or more LEDs (light emitting diodes)) and/or in a more complex form via a display (maximum flexibility with respect to the representation form—bars and/or symbols and/or plain text, etc.).

In addition to a merely continuous or periodical optical real time indication of the VoIP quality during a VoIP call at the end point an indication involving a delay or "lagging effect" (hysteresis) is possible. This is sensible in case of end points with which simultaneously telephoning and watching an optical indicator (e.g., a mobile held to the user's ear) is not possible. As an alternative to a (time) hysteresis, a cumulative optical indication is possible which provides for summary information ("memory") on the development of the quality information on a VoIP call so far.

As an alternative to the preferred approach of indicating the received quality (QRX; QRXA for end point A), an end point (end point A) can also indicate its own transmitted quality (QTXA). This is of particular interest if the end point is a device which is not dedicated to VoIP services, such as, e.g., a PC on which VoIP soft client and simultaneously other applications run. Alternatively, in addition to the indication of the received or the transmitted quality, the quality difference may be indicated (cf. description of FIG. 3 or 4).

As a further alternative, quality may be indicated over a browser, either in the device per se (e.g., an IP phone with display and browser) or a separate device (such as a PC).

As an alternative to the VoIP quality itself being indicated, the optical indication may also be restricted to just the indication of a deviation of the VoIP quality from normal conditions. Thus, there is no quality indication if quality is good (normal, target conditions)—but only if quality worsens, i.e. deviates from normal/target conditions.

As mentioned before, acoustic indication may be used as an alternative to optical indication, which makes sense if either an end point fails to fulfil the requirements of an optical indication (e.g., lack of a display) or the use of an end point (mobile held to the user's ear) does not permit to look at an optical indicator during the actual communication.

Acoustic indication may either be in band, i.e. over the reproducing channel used for communication (handset, loudspeaker), or over a separate transducer. If an acoustic in-band indication is used according to the invention, e.g. a recorded message describing the quality in plain text is played back. As an alternative, an audio signal is used with acoustic in-band indication or if a separate transducer is used, which signal may be gradually varied depending on the quality to be indicated (e.g., length of an intermittent tone, pitch etc.).

The method for indicating VoIP quality information at VoIP end points has been described above using the transmission over pure IP networks as an example. Moreover, the method described above may also be used if the IP protocol is transmitted (tunnelled) via another network or if the VoIP packets use a transmission protocol other than IP. In particular for mobile telephones, which involve unsecure transmission channels as compared with wired networks, optical and/or acoustic indication may be important even without VoIP. Apart from the medium voice, the method according to the present invention may also be applied to other media, such as video.

Legend

TX=transmit (transmitted VoIP packet sequence)
TXA=VoIP packet sequence transmitted at end point A
TXB=VoIP packer sequence transmitted at end point B
QTX=quality information of a transmitted VoIP packet sequence
QTXA=quality information of the VoIP packet sequence transmitted by end point A as determined at end point A
QTXB=quality information of the VoIP packet sequence transmitted by end point B as determined at end point B
RX=receive (received VoIP packet sequence)
RXA=VoIP packet sequence received at end point A
RXB=VoIP packet sequence received at end point B
QRX=quality information for a received VoIP packet sequence
QRXA=quality information for the VoIP packet sequence received by end point A as determined at end point A
QRXB=quality information for the VoIP packet sequence received by end point B as determined at end point B

The invention claimed is:
1. A method for assessing VoIP packet generation and transmission between a pair of end-points (A, B), the method comprising the steps of:
  a) end-point transmission of a VoIP packet sequence (TXA, TXB) and end-point reception of a VoIP packet sequence (RXA, RXB) sent between the end-points (A, B) over an IP network link;
  b) end-point determination of a VoIP reception signal quality (QRXA, QRXB) of the received VoIP packet sequence (RXA, RXB) and end-point determination of a VoIP transmission signal quality (QTXA, QTXB) of the transmitted VoIP packet sequence (TXA, TXB), wherein each of the end points (A, B) transmits at least one of the transmission signal quality (QTXA, QTXB) and the reception signal quality (QRXA, QRXB) to the other end point, and wherein
- (i) each of the end points (A, B) calculates the difference between the reception signal quality (QRXA, QRXB) determined at said end point (A, B) and the transmission signal quality (QTXB, QTXA) determined at the other end point (B, A), and
- (ii) each of the end points (A, B) calculates the difference between the transmission signal quality (QTXA, QTXB) determined at said end point (A, B) and the reception signal quality (QRXB, QRXA) determined at the other end point (B, A);

c) supply of the determined quality information (QRXA, QRXB) to a quality indication from one of the end points (A, B) to the other end point (B, A),
wherein the supplied quality information includes at least one selected from the group consisting of the quality (QRXA, QRXB) of the received VoIP packet sequence (RXA, RXB), and the quality (QTXA, QTXB) of the VoIP packet sequence (TXA, TXB); and
d) end-point indication of the quality information (QRXA, QRXB) by at least one of the end points (A, B).

2. The method according to claim 1, wherein the transmission signal quality (QTXA, QTXB) and the reception signal quality are determined continuously during a packet transmission and at the end of the packet transmission.

3. The method according to claim 1, wherein the determined quality information is reduced or completely inhibited when the determined quality information is for undisturbed sequences of a packet transmission or completely undisturbed packet transmissions.

4. The method according to claim 1, wherein
the generated quality information includes one of
a good quality statement,
a poor quality statement, and
a statement expressing a gradual quality deviation from a normal or target condition, and
the quality information refers to an entire VoIP call or only a part thereof.

5. The method according to claim 1, wherein at least one of the end points (A, B) transmits the calculated difference to the other end point.

6. The method according to claim 1, wherein step d) involves an optical indicator.

7. The method according to claim 6, wherein the optical indicator sums up the preceding quality information development.

8. The method according to claim 7, wherein the end point indication is made by the indicator as plain text information describing a quality problem or as a symbol.

9. The method according to claim 7, wherein the quality information indication involves a time hysteresis.

10. The method according to claim 1, wherein the quality information is indicated acoustically.

11. The method according to claim 10, wherein the acoustic indication is in band over an acoustic output device used for VoIP communication or over a separate acoustic transducer.

12. The method according to claim 10, wherein the acoustic indication is a message describing a quality problem in plain text or as a tone or a tone sequence, wherein in case of the tone or tone sequence one parameter varies so as to express the quality or a degree of quality deviation from nominal or target conditions.

13. The method according to claim 12, wherein the parameter is volume or pitch.

14. The method according to claim 1, wherein step d) involves both optical and acoustic indications.

15. The method according to claim 1, wherein the determined quality information includes a distance or variance of the distance between individual IP packets or information expressing concrete reasons of a quality restriction.

16. A device for assessing VoIP packet generation and transmission, comprising an end-point for transmitting and receiving a VoIP packet sequence over an IP network link, the end-point comprising:
a first unit configured to determine a quality (QRXA, QRXB) of the received VoIP packet sequence (RXA, RXB);
a second unit configured to determine a quality (QTXA, QTXB) of the transmitted VoIP packet sequence (TXA, TXB);
a third unit configured to exchange said quality information between the involved end points;
a fourth unit configured to determine the quality information difference of the received VoIP packet sequence transmitted by the other side and the quality information difference of the transmitted VoIP packet sequence received by the other side;
a fifth unit configured to exchange the quality information difference between the end points involved;
a sixth unit configured to supply the determined VoIP quality information which includes at least one of the quality (QRXA, QRXB) and the quality (QTXA, QTXB), to an indicator; and
the indicator configured to indicate the quality information,
wherein the third unit is further configured to supply said determined quality information to an end point of the other side, and
wherein the supplied quality information includes at least one selected from the group consisting of the quality (QRXA, QRXB) of the received VoIP packet sequence (RXA, RXB), and the quality (QTXA, QTXB) of the VoIP packet sequence (TXA, TXB).

17. A VoIP packet generation and transmission system, comprising:
a first end point (A) having a transmitter and a receiver;
a second end point (B) having a transmitter and a receiver;
wherein
each of the two end points (A, B) is configured to determine a reception quality (QRXA, QRXB) of a VoIP packet sequence (RXA, RXB) received from the other end point (B, A) and transmit the reception quality information (QRXA, QRXB) to the transmitting end point (B, A);
the other end point (B, A) is configured to determine a transmission quality (QTXA, QTXB) of the transmitted VoIP packet sequence and transmit the transmission quality information (QTXA, QTXB) to the receiving end point (A, B);
(i) the receiving end point is configured to calculate the difference between the reception and transmission quality information (QRXA-QTXB or QRXB-QTXA) and calculate VoIP quality information from the difference between the reception quality and the transmission quality information of the other end point; and
(ii) the transmitting end point is configured to calculate the difference of the reception and transmission quality information (QTXA-QRXB or QTXB-QRXA)

and calculate the VoIP quality information from the difference of the transmission quality and the reception quality information at the other end point; and at least one of the receiving end point and the transmitting end point is configured to indicate one or more of the reception, transmission and VoIP quality information.

* * * * *